United States Patent [19]

Mito

[11] Patent Number: 5,059,408
[45] Date of Patent: Oct. 22, 1991

[54] CARBON BLACK FOR TIRE TREAD
[75] Inventor: Masahiko Mito, Aichi, Japan
[73] Assignee: Tokai Carbon Co., Ltd., Tokyo, Japan
[21] Appl. No.: 420,405
[22] Filed: Oct. 12, 1989
[30] Foreign Application Priority Data Dec. 12, 1988 [JP] Japan .................... 63-313304

[51] Int. Cl.[5] .................... C01B 31/02; C09C 1/48
[52] U.S. Cl. .................... 423/445; 423/449; 423/450; 423/458
[58] Field of Search ............ 423/445, 450, 449, 458

[56] References Cited

U.S. PATENT DOCUMENTS

| | | | |
|---|---|---|---|
| 4,071,496 | 1/1978 | Kraus et al. | 423/450 |
| 4,250,145 | 2/1981 | Pobst et al. | 423/450 |
| 4,267,160 | 5/1981 | Kraus et al. | 423/450 |
| 4,287,743 | 9/1981 | Ruble | 423/450 |
| 4,316,881 | 2/1982 | Pobst et al. | 423/450 |
| 4,500,672 | 2/1985 | Suzuki et al. | 423/445 |

Primary Examiner—Robert Kunemund
Attorney, Agent, or Firm—Armstrong, Nikaido, Marmelstein, Kubovcik & Murray

[57] ABSTRACT

There is disclosed carbon black for a tire tread which has a cetyltrimethylammonium bromide specific surface area (CTAB) of 120 to 160 M$^2$/g, a dibutyl phthalate absorption number of compressed sample (24M4DBP) of at least 100 to 145 ml/100g, a tinting strength (Tint) of 100 to 150%, and such a value Ma defined by the following equation (1) as to satisfy the relationship expressed by the following formula (2):

$$Ma = 0.792 \times \frac{[24M4DBP]^2}{[N_2SA]^2} \times \frac{[Tint]}{[\bar{D}st]} \quad (1)$$

wherein $N_2SA$ is a nitrogen adsorption specific surface area (m$^2$/g), and $\bar{D}st$ is the equivalent Stokes diameter (nm) at the maximum absorbance of the distribution curve of aggregates determined by the centrifugal classification method, and ps $$Ma \geq 1.7 - 0.005 \, [CTAB]TM \ldots (2).$$

1 Claim, 1 Drawing Sheet

CARBON BLACK FOR TIRE TREAD

BACKGROUND OF THE INVENTION

The present invention relates to carbon black for a tire tread, and more particularly to carbon black which can remarkably improve the abrasion resistance of a tire tread.

Occasions to run dump trucks and off-road cars even on good roads such as general roads as well as extremely bad roads such as mountain paths and quarries have recently been increasing in step with development of various high-performance automobiles. Inversely, occasions to run common vehicles even on rough roads in mountainous areas as well as highways maintained in good conditions has been increasing in keeping with diversification of leisure time activities.

Under such circumstances, carbon black for use in tire treads is also required to be able to impart a high abrasion resistance to a tire tread under a variety of surface conditions of roads ranging from good ones to bad ones.

In general, such grades of carbon black as having a small particle size and hence a large specific surface area, such as SAF (N-110) and ISAF (N-220), are used in applications of rubbers wherein a high abrasion resistance is required.

However, these grades of carbon black are hindered in the development of structure and particularly lowered in dibutyl phthalate absorption number of compressed sample (24M4DBP) to fail to impart to a tire tread a sufficient abrasion resistance under conditions of bad roads while notably increasing the heat build-up therein.

In contrast, when the structure of carbon black is well developed, the carbon black is greatly decreased in tinting strength to fail to impart to a tire tread a sufficient abrasion resistance under conditions of good roads, though it is improved in reinforcing effect and contributes to a slightly increasing the heat build-up in tire treads and some improvement in the abrasion resistance thereof. Accordingly, development, if made, of carbon black capable of imparting to a tire tread a high abrasion resistance under every possible surface conditions of roads ranging from good ones to bad ones without incurring any increase in the heat build-up in the tire tread can well cope with the current demand ensuing from the foregoing problems of the art. In order to meet this demand, however, antinomic characteristics of a high tinting strength and a high 24M4DBP must be simultaneously established.

The inventors of the present invention previously proposed carbon black having an excellent dispersibility in rubbers and a capability of imparting a high abrasion resistance to large tire treads (see Japanese Patent Application No. 63-195850). The inventors of the present invention have made investigations with a view to further improving the abrasion resistance of tire treads containing carbon black compounded thereinto in connection with the invention of the above-mentioned prior application and, as a result, have found out carbon black endowed with both of a high tinting strength and a high 24M4DBP.

SUMMARY OF THE INVENTION

A first object of the present invention is to provide carbon black capable of imparting a remarkably improved abrasion resistance to a tire tread. A second object of the present invention is to provide carbon black capable of imparting to a tire tread an excellent abrasion resistance under every possible environmental running conditions of roads ranging from good ones to bad ones.

BRIEF DESCRIPTION OF THE DRAWINGS

The single FIGURE is a longitudinal sectional view of a furnace for producing the furnace carbon black used in this invention.

DETAILED DESCRIPTION OF THE PREFERRED EMBODIMENTS

Figure 1:
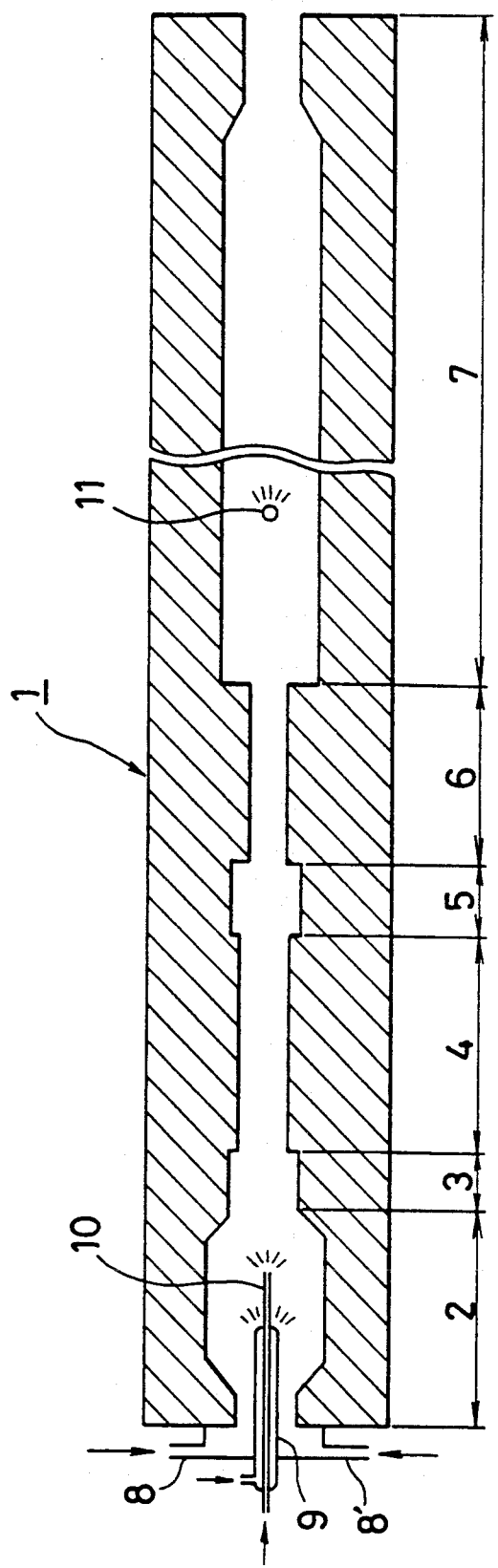

The carbon black for a tire tread according to the present invention has a cetyltrimethylammonium bromide specific surface area (CTAB) of 120 to 160 $m^2/g$, a dibutyl phthalate absorption number of compressed sample (24M4DBP) of 100 to 145 ml/100 g, a tinting strength (Tint) of 100 to 150%, and such a value Ma defined by the following equation (1) as to satisfy the relationship expressed by the following formula (2).

$$Ma = 0.792 \times \frac{[24M4DBP]^2}{[N_2SA]^2} \times \frac{[Tint]}{[Dst]} \quad (1)$$

wherein $N_2SA$ is the nitrogen adsorption specific surface area ($m^2/g$), and $\overline{D}st$ is the equivalent Stokes diameter (nm) at the maximum absorbance of the distribution curve of aggregates determined by the centrifugal classification method.

$$Ma \geq 1.7 - 0.005 [CTAB] \quad (2)$$

A value of CTAB of 120 to 160 $m^2/g$, a value of 24M4DBP of 100 to 145 ml/100 g, and a value of Tint of 100 to 150 are all fundamental prerequisites for the carbon black of the present invention to impart suitable abrasion resistance and heat build-up to a rubber blend. When these values are below the lower limits of the above-mentioned ranges, a high abrasion resistance, the attainment of which is the purpose of the present invention, cannot be secured.

When the values of CTAB and Tint exceed the upper limits of the above-mentioned ranges, the head build-up in a rubber blend is notably increased. When the value of 24M4DBP exceeds the above-mentioned upper limit, carbon black is lowered in dispersibility and processability and brings about a rise in the hardness of a rubber blend to lower the abrasion resistance thereof.

In general, an increase in CTAB is effective in improving the abrasion resistance of a rubber blend. However, it unfavorably is accompanied by not only a notable decrease in processability but also a decrease in 24M4DBP and an increase in $N_2SA$. Therefore, the value Ma defined by the value of the aforementioned equation (1) is decreased. The value Ma is an index indicative of the relationship between the 24M4DBP per specific surface area and the Tint. The value Ma of the carbon black of the present invention is higher than those of conventional grades of carbon black.

A high abrasion resistance under the conditions of good roads can be imparted to a tire tread by the use of carbon black having a value of CTAB increased to raise the value of Tint and lower the value of $\overline{D}st$. However, the use of such carbon black brings about an increase in the heat build-up in the tire tread and deteriorates the abrasion resistance of the tire tread in keeping with a concurrent decrease in 24M4DBP under conditions of bad roads.

Accordingly, it is difficult to impart to a tire tread rubber a good abrasion resistance under conditions of both of the good and bad roads by compounding thereinto carbon black merely reduced in particle size and hence increased in specific surface area. For example, as the value of CTAB is increased, the value of $N_2SA$ is greatly increased and the value of 24M4DBP is lowered. On the other hand, as the value of 24M4DBP is increased, the value of Tint is lowered and the value of $\overline{D}st$ is increased. Accordingly, the value of Ma is lowered relative to the increasing value of CTAB. Thus, conventional grades of carbon black generally belong to a class of those having a value Ma below the value of $1.7 - 0.005$ [CTAB].

The carbon black of the present invention is endowed with high levels of both Tint and 24M4DBP when compared on the basis of the specific surface area. Such a characteristic feature works together with the aforementioned values of CTAB, 24M4DBP, Tint and Ma to make it possible to impart to a tire tread consistently a high abrasion resistance under various abrasion severities ensuing from not only good roads but also bad roads while preventing the heat build-up in the tire tread from increasing.

The characteristic values of the above-mentioned carbon black were measured according to the following methods.

(1) CTAB

ASTM D3765-80 "Standard Test Method for Carbon Black - CTAB (cetyltrimethylammonium bromide) Surface Area."

(2) 24M4DBP

ASTM D3493-85a "Standard Test Method for Carbon Black - Dibutyl Phthalate Absorption Number of Compressed Sample."

(3) Tint

JIS K6221-82 "Testing Methods of Carbon Black for Rubber Industry", Section 6.1.3. The details of the method are as follows. IRB #3 was used as a control sample.

A dry carbon black sample in an amount of 0.1000 g ($\pm 0.0002$ g) is mixed with 3.000 g of zinc oxide and 1.50 ml of linseed oil by using a Hoover type muller with 125 rotations (25 rotations in one mixing, repeated 5 times) under a load of 6.8 kg (15 lbs). The resulting paste is applied in a prescribed thickness onto a glass plate using a film applicator (0.002 inch). The reflectance (T) of the carbon black paste applied onto the glass plate is measured with a reflection photometer (Densicron, Welch Scientific Co., A9155, reflector head #3832A) which is so adjusted as to indicate 50% reflectivity for the paste of the standard carbon black sample. The tinting strength of the carbon black sample is calculated from the following equation:

$$\text{tinting strength} = 50/T \times [\text{tinting strength (\%) of standard carbon black}]$$

(4) $N_2SA$

ASTM D3037-86 "Standard Test Methods for Carbon Black - Surface Area by Nitrogen Adsorption" Method B.

(5) $\overline{D}st$

A carbon black sample is dried according to JIS K6221 (1975), Section 6.2.1, Method A. The dried carbon black sample is accurately weighed out and dispersed into a 20% aqueous solution of ethanol containing a small quantity of a surface active agent (dispersing agent) to prepare a dispersion of carbon black in a concentration of 50 mg/l. Complete dispersion is accomplished ultrasonically.

Then, the dispersion is subjected to centrifugal classification by a disk centrifuge (made by Joyes Loebl Co., England) set at 8,000 rpm. 10 to 20 ml of a spin liquid (2% aqueous solution of glycerin) is added and then 1 ml of a buffer (aqueous solution of ethanol) is added. Finally, 0.5 ml of the dispersion of carbon black is added by means of a syringe. Centrifugation is started. Simultaneously, a recorder is also started to draw a distribution curve of aggregates.

The Dst mode diameter ($\overline{D}st$) is defined as the equivalent Stokes diameter (nm) at the mode (maximum absorbance) of the distribution curve of aggregates.

The $\overline{D}st$ of ASTM D-24 Standard Reference Black C-3 N234 according to this measuring method is 80 nm.

The carbon black of the present invention satisfying the above-described characteristics requirements can be prepared by making use of a reactor of a usual oil furnace system shown in FIG. 1 and setting various conditions, such as generating reaction temperature (fuel oil combustion rate), time taken until a carbon black generating reaction is ceased by introducing water into the furnace via an opening 11, flow rate of a combustion gas passing through a front small-diameter reaction chamber and a rear small-diameter reaction chamber respectively at values shown in the following Table 1.

Examples of the present invention will now be described.

The methods of measuring the various characteristic properties of vulcanized rubber compositions in Examples and Comparative Examples are as follows.

(a) Abrasion Loss

Abrasion loss was measured with a Lambourne abrasion tester (with mechanical slip mechanism) under the following conditions:

test piece: 10 mm thick, 44 mm in outside diameter
Emery wheel: GC type; grain size: #80; hardness: H
carborundum added: grain size: #80, adding rate: approximately 9 g/min
relative slip ratio of Emery wheel surface to test piece: 24%, 60%
speed of revolution of test piece: 535 rpm load on test piece: 4 kg (b) Mooney Viscosity The determination was made according to JIS K6300 "Physical Testing Methods for Unvulcanized Rubber".

(c) Others

The determination was made according to JIS K6301-1975 "Physical Testing Methods for Unvulcanized Rubber".

EXAMPLES AND COMPARATIVE EXAMPLES

Carbon black was prepared under various conditions by making use of an oil furnace system 1 shown in FIG. 1 which comprises a combustion chamber 2 (a diameter of 550 mm; a length of 600 mm) provided on a reactor head and equipped with two tangential air feed ports 8 and 8', a fuel oil burner 9 fitted in the direction of the reactor axis, a feedstock oil spray nozzle 10, a front small-diameter reaction chamber coaxially connected to the combustion chamber 2 (a first reaction chamber 3: a diameter of 220 mm; a length of 150 mm, a second reaction chamber 4: a diameter of 140 mm; a length of 600 mm, a third reaction chamber 5: a diameter of 220 mm;

a length of 150 mm, and a fourth reaction chamber 6: a diameter of 150 mm; a length of 500 mm), and a large-diameter reaction chamber 7 coaxially connected to the fourth reaction chamber 6.

An aromatic hydrocarbon oil having a specific gravity of 1.073 (15/4° C.), a viscosity of 2.10 (Engler: 40/20° C.) of 2.10, a toluene-insolubles content of 0.03%, a coefficient of correlation (BMCI) of 140 and an initial boiling point of 103° C. was used as a stock oil, and a hydrocarbon oil having a specific gravity of 0.903 (15/4° C.), a viscosity (CST: 50° C.) of 16.1, a residual carbon content of 5.4%, a sulfur content of 1.8% and a flash point of 96° C. was used as a fuel oil.

Tables I and II show the generating conditions and characteristic properties, respectively, of a variety of carbon black according to the present invention under Examples Nos. Comparative Examples 1 to 4 in Table II are concerned with grades of carbon black falling outside the scope of the present invention in respect of the characteristic properties as specified therein.

TABLE I

| Conditions | Ex. No. | | | | | |
|---|---|---|---|---|---|---|
| | 1 | 2 | 3 | 4 | 5 | 6 |
| Total air feed rate (Nm³/H) | 4200 | 4410 | 3360 | 4000 | 3570 | 4410 |
| Fuel oil feed rate (kg/H) | 217 | 196 | 134 | 171 | 134 | 201 |
| Fuel combustion rate (%) | 190 | 220 | 245 | 230 | 260 | 215 |
| Combustion gas flow rate (m/sec) | | | | | | |
| at a diameter of 220 mm | 164 | 160 | 115 | 142 | 119 | 168 |
| at a diameter of 140 mm | 405 | 394 | 285 | 349 | 294 | 416 |
| at a diameter of 150 mm | 352 | 342 | 248 | 304 | 255 | 362 |
| Feed rate of stock oil (kg/H) | 981 | 710 | 518 | 619 | 510 | 743 |
| Residence time in reaction zone* (m/sec) | 26.1 | 25.3 | 26.7 | 27.1 | 24.3 | 27.3 |

(Note)
*Residence time till a gas containing generated carbon black reaches the point of water cooling

TABLE II

| Case No. | CTAB (m²/g) | N₂SA (m²/g) | 24M4 (ml/100 g) | Tint (%) | Dst (nm) | Ma | 1.7-0.005 [CTAB] |
|---|---|---|---|---|---|---|---|
| Ex. | | | | | | | |
| 1 | 122 | 134 | 128 | 119 | 75 | 1.147 | 1.090 |
| 2 | 135 | 151 | 134 | 127 | 66 | 1.200 | 1.025 |
| 3 | 143 | 158 | 137 | 121 | 70 | 1.029 | 0.985 |
| 4 | 156 | 170 | 131 | 136 | 63 | 1.015 | 0.920 |
| 5 | 148 | 162 | 143 | 127 | 58 | 1.351 | 0.960 |
| 6 | 125 | 138 | 136 | 124 | 64 | 1.490 | 1.075 |
| Comp. Ex. | | | | | | | |
| 1 | 125 | 145 | 124 | 115 | 80 | 0.832 | 1.075 |
| 2 | 150 | 158 | 114 | 137 | 73 | 0.774 | 0.950 |
| 3 | 132 | 142 | 99 | 129 | 78 | 0.637 | 1.040 |
| 4 | 125 | 130 | 106 | 131 | 73 | 0.944 | 1.075 |
| 5 | 158 | 173 | 103 | 142 | 61 | 0.653 | 0.910 |

Then, these types of carbon black were each compounded into natural rubber in a compounding ratio shown in Table III.

TABLE III

| Compounding Components | pts. wt. |
|---|---|
| natural rubber (RSS #1) | 100 |
| carbon black | 50 |
| aromatic oil (softening agent) | 4 |
| stearic acid (dispersion vulcanization assistant) | 3 |
| zinc oxide (vulcanization assistant) | 5 |
| dibenzothiazyl disulfide (vulcanization accelerator) | 1 |
| sulfur (vulcanizing agent) | 2.5 |

The compounded rubber shown in Table III was vulcanized at 145° C. to prepare a rubber composition. The rubber composition was subjected to measurement of various rubber characteristics. The results are shown in Table IV with Ex. Nos. and Comp. Ex. Nos.

TABLE IV

| Case No. | Abrasion loss | | Hardness (Hs) | 300% Modulus (kg/cm²) | Impact resilience (%) |
|---|---|---|---|---|---|
| | LA 24% (ml/5 min) | LA 60% (ml/min) | | | |
| Ex. | | | | | |
| 1 | 0.0774 | 0.0794 | 70 | 165 | 47 |
| 2 | 0.0740 | 0.0769 | 72 | 172 | 46 |
| 3 | 0.0712 | 0.0763 | 72 | 182 | 45 |
| 4 | 0.0686 | 0.0781 | 72 | 184 | 44 |
| 5 | 0.0692 | 0.0751 | 74 | 191 | 44 |
| 6 | 0.0759 | 0.0769 | 73 | 168 | 47 |
| Comp. Ex. | | | | | |
| 1 | 0.0826 | 0.0847 | 70 | 162 | 47 |
| 2 | 0.0720 | 0.0860 | 71 | 159 | 44 |
| 3 | 0.0742 | 0.0917 | 69 | 146 | 46 |
| 4 | 0.0777 | 0.0942 | 70 | 174 | 48 |
| 5 | 0.0711 | 0.0919 | 72 | 147 | 43 |

As is apparent from Table IV, the rubber compositions of the Examples were improved in abrasion losses LA 24% and LA 60% corresponding to those on good and bad roads, respectively, over the rubber compositions of the Comparative Examples while keeping the heat build-up performances thereof on substantially the same level as those of the Comparative Examples when a comparison was made between carbon black used in each Example and carbon black used in each Comparative Example which had the same level of CTAB.

Particularly the rubber compositions of the Examples were recognized to be improved in abrasion resistance on bad roads without detriment to the abrasion resistance on good roads to prove that they were obviously improved in the balance of abrasion resistance performance between good and bad roads.

As described above, the carbon black of the present invention can impart to a tread-compounding rubber a high abrasion resistance under running conditions in every environment ranging from good roads to bad roads. Therefore, the carbon black of the present invention is useful for tire treads of various automobiles to sufficiently satisfy the performances required thereof.

What is claimed is:

1. Carbon black for a tire tread which has a cetyltrimethylammonium bromide specific surface area (CTAB) of 120 to 160 m²/g, a dibutyl phthalate absorption number of compressed sample (24M4DBP) of at least 100 to 145 ml/100 g, a tinting strength (Tint) of 100 to 150%, and such a value Ma defined by the following equation (1) as to satisfy the relationship expressed by the following formula (2):

$$Ma = 0.792 \times \frac{[24M4DBP]^2}{[N_2SA]^2} \times \frac{[Tint]}{[\overline{D}st]} \quad (1)$$

wherein $N_2SA$ is a nitrogen adsorption specific surface area (m²/g), and $\overline{D}st$ is the equivalent Stokes diameter (nm) at the maximum absorbance of the distribution curve of aggregates determined by the centrifugal classification method, and $$Ma \geq 1.7 - 0.005 [CTAB] \quad (2).$$

* * * * *